United States Patent
Enomoto et al.

(10) Patent No.: US 9,212,902 B2
(45) Date of Patent: Dec. 15, 2015

(54) DISTANCE IMAGE OBTAINING SYSTEM FOR TRACK

(75) Inventors: Masayuki Enomoto, Kobe (JP); Tadao Shimada, Akashi (JP); Yohichi Nakamura, Kobe (JP); Keita Kataoka, Tokyo (JP); Hiroyuki Matsuda, Tokyo (JP); Masanobu Kozeki, Tokyo (JP)

(73) Assignees: KAWASAKI JUKOGYO KABUSHIKI KAISHA, Hyogo (JP); EAST JAPAN RAILWAY COMPANY, Tokyo (JP)

( * ) Notice: Subject to any disclaimer, the term of this patent is extended or adjusted under 35 U.S.C. 154(b) by 509 days.

(21) Appl. No.: 13/172,068

(22) Filed: Jun. 29, 2011

(65) Prior Publication Data

US 2012/0062731 A1 Mar. 15, 2012

(30) Foreign Application Priority Data

Mar. 31, 2010 (JP) ................. 2010-082134

(51) Int. Cl.
*H04N 7/18* (2006.01)
*G01B 11/25* (2006.01)
*G01B 11/245* (2006.01)

(52) U.S. Cl.
CPC .......... *G01B 11/2513* (2013.01); *G01B 11/245* (2013.01); *G01B 11/2527* (2013.01)

(58) Field of Classification Search
None
See application file for complete search history.

(56) References Cited

U.S. PATENT DOCUMENTS

| | | | |
|---|---|---|---|
| 6,668,239 B1 * | 12/2003 | Gilbert et al. | 702/188 |
| 8,081,320 B2 * | 12/2011 | Villar et al. | 356/606 |
| 8,189,049 B2 * | 5/2012 | Lopota et al. | 348/152 |
| 2002/0045975 A1 * | 4/2002 | Carr et al. | 701/19 |
| 2002/0080148 A1 * | 6/2002 | Uchino | 345/629 |
| 2004/0056182 A1 * | 3/2004 | Jamieson et al. | 250/221 |
| 2004/0080614 A1 * | 4/2004 | Uemura | 348/96 |
| 2005/0219361 A1 * | 10/2005 | Aoki et al. | 348/159 |
| 2006/0098843 A1 * | 5/2006 | Chew | 382/103 |
| 2009/0196486 A1 * | 8/2009 | Distante et al. | 382/141 |
| 2009/0319197 A1 * | 12/2009 | Villar et al. | 702/34 |
| 2010/0201820 A1 * | 8/2010 | Lopota et al. | 348/152 |
| 2012/0274768 A1 * | 11/2012 | Aaron et al. | 348/148 |
| 2013/0170709 A1 * | 7/2013 | Distante et al. | 382/104 |

FOREIGN PATENT DOCUMENTS

JP A-2006-176071 7/2006
JP A-2008-224631 9/2008

* cited by examiner

*Primary Examiner* — Dave Czekaj
*Assistant Examiner* — Kehinde O Abimbola
(74) *Attorney, Agent, or Firm* — Oliff PLC

(57) ABSTRACT

A range image obtaining system for a track includes a laser slit light source disposed within a plane perpendicular to a tread of a rail and emits laser slit light within the plane; a two-dimensional image imaging device which is disposed to have an angle with respect to the plane perpendicular to the tread of the rail and obtains a light sectioning image generated from the laser slit light; and an image signal processing device for generating a range image based on a distance from the two-dimensional image imaging device based on the light sectioning image.

7 Claims, 4 Drawing Sheets

DISTANCE IMAGE OBTAINING SYSTEM FOR TRACK

BACKGROUND ART

1. Field of the Invention

The present invention relates to a range (distance) image obtaining system which collects range image data of a region in the vicinity of a railway track while running along the railway track and inspects fastening devices, joint bars, track pads, etc.

2. Description of the Related Art

Rails in a railway are fixed at correct positions by fastening devices, joint bars, etc., to ensure safety in operation. The fastening devices of the rails are configured such that tip end portions of leaf springs press both sides of a base portion of the rail to secure the rails. Each leaf spring applies a pressing force by pressingly attaching its center portion onto a sleeper by means of a fastening bolt. If the rail fastening bolt gets loose, the tip end portion of the leaf spring could lift up from the base portion of the rail, causing the rail to be displaced laterally or a rail pad used for adjusting a height of the rail to be disengaged. This could possibly lead to a big accident. The joint bar is in contact with the side surfaces of the rails at abutted portions of their ends and is fastened to the rails by means of bolts to allow the rails to be joined together to provide continuity. Therefore, if the bolt gets loose, a joint portion of the rail is displaced and collides against a wheel, causing an abnormal vibration to be generated, or the wheel to be disengaged from the rail. This also could possibly lead to a big accident.

For the above stated reasons, it is necessary to inspect whether or not the fastening bolt and the joint-bar bolt are loose on a regular basis. Whether or not these bolts are loose is inspected by maintenance persons making the rounds for inspection in, for example, nighttime when running trains are fewer. The maintenance persons visually inspect whether or not the bolts are loose by visual observation or by hearing a sound made by hitting a driver. Under the circumstances, there is a need for a number of skillful maintenance persons, and there is a possibility that the loose of the bolts is overlooked because the inspection is performed by the persons. To solve this, an inspection system for monitoring the state of the fastening device and the state of the joint bar could possibly be incorporated into a railcar running along a track to detect their abnormalities, for the sake of convenience. Detecting the state of the rails on a daily basis by using an automatic inspection system is useful for preventive maintenance. In addition, the inspection performed by the maintenance persons who make the rounds is risky, and therefore it is expected that inspection is performed by the inspection system mounted to the railcar.

Japanese Laid-Open Patent Application Publication No. 2006-176071 discloses a track image analyzing system for determining a location of a sleeper. The track image analyzing system disclosed in Patent Literature 1 includes an image sensor positioned vertically above a fastening device in the vicinity of the rail, and a lamp for performing lighting with a vergence angle of 5 to 35 degrees with respect to an optical axis of an image sensor, to easily obtain a railway track image having a shade. The track image analyzing system disclosed in this publication is positioned under a floor of a track checking railcar and actuates an imaging device to obtain an image signal during high-speed running. An integrated value of a signal determined as an edge from an image output of the imaging device is calculated, and a region with a lower edge integrated value is identified as a surface of the sleeper. Thus, the location of the sleeper is determined. Furthermore, for each sleeper, it can be determined whether or not there is an abnormality in the fastening device, based on whether or not there is an edge in a location where the fastening device should be present Japanese Laid-Open Patent Application Publication No. 2008-224631 discloses an inspection system mounted under a floor of a track checking railcar or the like, to inspect the degree to which rail fastening bolts of a railway are loose during running. The inspection system disclosed in this publication detects a spot laser applied to a head of the fastening bolt by a line sensor, and measures the height of the head of the fastening bolt based on a principle of triangulation, thereby detecting an abnormality of a tightening state of the bolt. Since the track checking railcar runs at a high speed of about 110 km/hr, the railcar moves up and down, and shakes in a horizontal direction. Therefore, a measurement location fluctuations, which is unavoidable. Furthermore, there are plural forms of a leaf spring which presses the rail, and therefore, a location of the fastening bolt changes depending on the kind of the leaf spring.

The inspection system disclosed in Japanese Laid-Open Patent Application Publication No. 2008-224631 evaluates the loose of the bolt correctly by measuring the height of the top head portion of a rail and calculating the height of the head portion of the bolt on the basis of the top head portion of the rail. In order to prevent a failure to detect the loose of the bolt due to lateral swaying of the railcar or incorrect positions of the fastening device, a plurality of spot laser projectors are arranged, and at least one of the spot laser projectors is adapted to emit the light to the bolt. The respective spot laser projectors are configured to emit light with a time difference so that a reference line of triangulation can be identified correctly.

In actuality, however the inspection system disclosed in Japanese Laid-Open Patent Application Publication No. 2006-176071 is utilized to determine a recorded image by visual inspection, because automatic inspection determination is difficult due to the fact that three-dimensional information is not obtained, the inspection system is significantly affected by contamination, rust, and others The inspection system disclosed in Japanese Laid-Open Patent Application Publication No. 2008-224631 has a problem that the spot laser projector can determine only the height of a target portion and cannot determine an abnormal state of a component such as the joint-bar bolt in a loose state, which is merely moved in a horizontal direction, and the height of the head of the bolt does not change. In addition, since a highest point of a component is detected based on only height information, it is difficult to identify this distinctively from a ballast, a cable disturbance, and others.

SUMMARY OF THE INVENTION

Accordingly, an object to be achieved by the present invention is to provide a range image obtaining system for a track which is disposed under a floor of a railcar and obtains image information for use in inspection of abnormalities of devices in the vicinity of a railway track such as rail fastening devices, joint bars, traction pads, etc., during running of the railcar, in order to accurately determine whether or not these devices are abnormal.

To achieve the above object, a range image obtaining system for a track of the present invention, comprises a laser slit light source disposed within a plane perpendicular to a tread of a rail and emits a laser slit light within the plane perpendicular to the tread; a two-dimensional image imaging device which is disposed to have an angle with respect to the plane perpendicular to the tread and obtains a light sectioning image generated based on the laser slit light; and an image signal processing device for generating a range image based on a distance from the two-dimensional image imaging device based on the obtained light sectioning image.

As a two-dimensional image imaging device used to obtain light sectioning images of a relatively narrow region in the vicinity of the rail, there is a commercially available profile camera capable of taking images 10000 times or more times for 1 second, for example. By obtaining light sectioning images at very small intervals along the rail by using such a camera, calculating distances from the camera to light sectioning lines in the images, and re-arranging the distances as an image indicating the distances on a flat plane, the range image with a high density can be obtained. For example, by representing a height distance of an individual portion by gray scales or color, and displaying it on an image display device as a gray scale image or a color image, a person can determine the shape and dimension of a target object based on the image representing distance information which can be perceived by the person. By making use of images taken at certain distance intervals in response to trigger signals issued according to a running distance, a range image corresponding to an actual dimension is obtained.

The range image obtaining system for the track may comprise an image memory device for storing an image signal of the image obtained by the two-dimensional image imaging device in a portable memory medium, wherein the image signal processing device is configured to generate the range image based on the image signal received from the portable memory medium. In a configuration in which the image signal can be transmitted via the portable memory medium, it is not necessary to analyze the image signal inside the railcar immediately, because the image signal can be read out from the memory medium and analyzed in a later time in an analysis chamber on the ground in which devices are fully equipped.

The image memory device and the two-dimensional image imaging device may be accommodated into a casing provided in a location above a rail and under a floor of a railcar.

In a case where the laser slit light has an insufficient intensity, a plurality of laser slit light sources may be arranged such that their slit light emitting planes overlap with each other to achieve an enhanced light intensity.

Since the fastening device and the joint bar are arranged at each of both sides of the rail, combinations each including the laser slit light source and the two-dimensional image imaging device are preferably arranged at both sides of the rail. Moreover, since two rails are provided, the range image obtaining system for the track is preferably provided for each of the rails.

The range image obtaining system for the track may comprise an information processing device which inspects a fastening device and a joint bar in such a manner that each of a three-dimensional shape model of the fastening device and a three-dimensional shape model of the joint bar is compared to the range image, to check whether or not a desired location and desired shape of the fastening device and a desired location and desired shape of the joint bar are maintained.

By using an output pulse of a tachometer generator to obtain a light sectioning image at every specified distance interval, the range image can be formed as a plane view which has an equal density on both a longitudinal axis and a lateral axis The above and further objects and features of the invention will more fully be apparent from the following detailed description with accompanying drawings.

DETAILED DESCRIPTION OF THE PREFERRED EMBODIMENTS

Hereinafter, embodiment of the present invention will be described with reference to the drawings.

A range (distance) image obtaining system for a track 10 according to the embodiment is configured to obtain detailed three-dimensional shape data of a region in the vicinity of a railway track during running along the railway track and collects data used for inspecting instruments in the vicinity of the railway track such as fastening devices, joint bars, track pads, etc.

Figure 1:
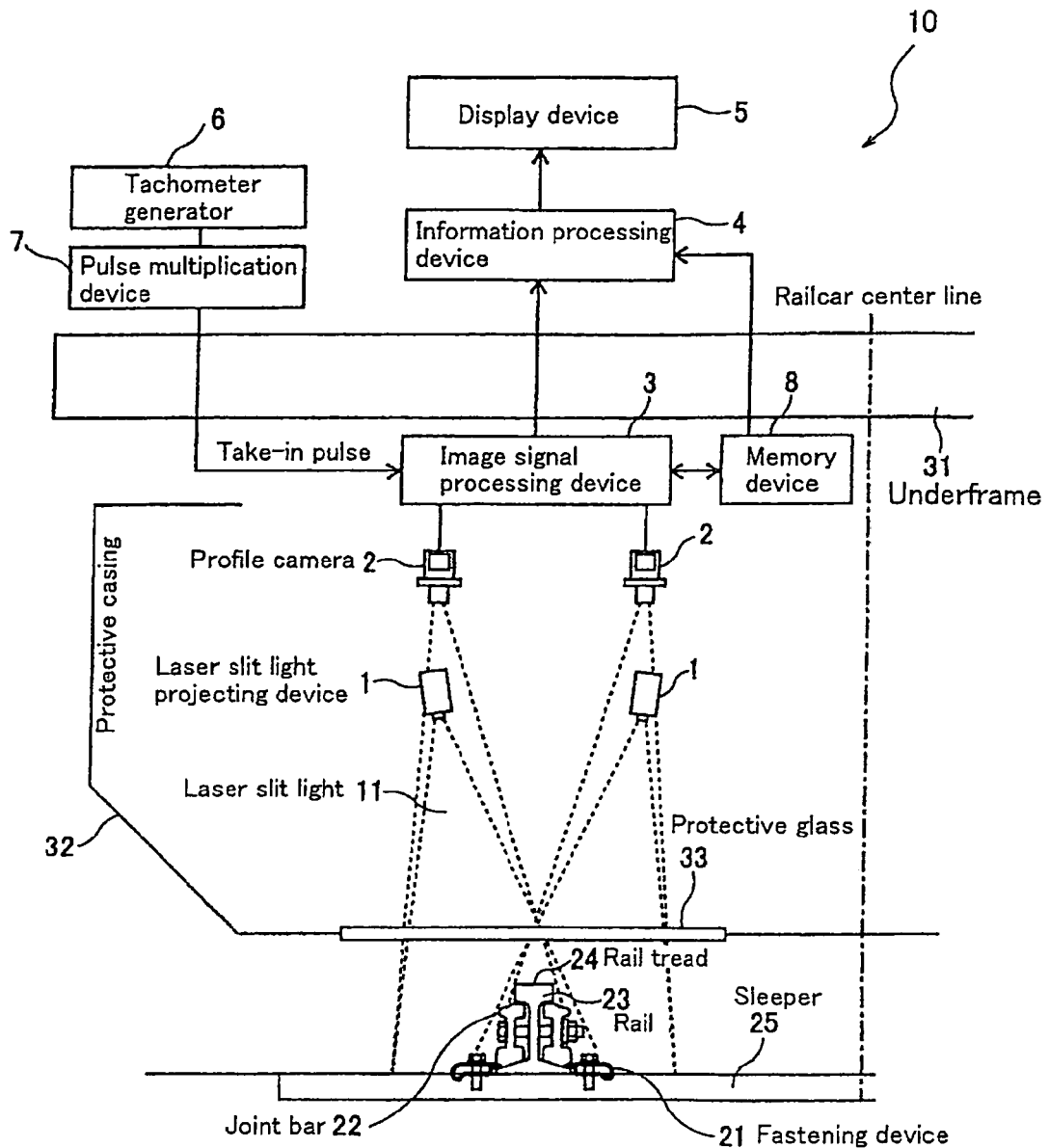
FIG. 1 is a schematic view of a range image obtaining system for a track according to an embodiment of the present invention.
Figure 3:
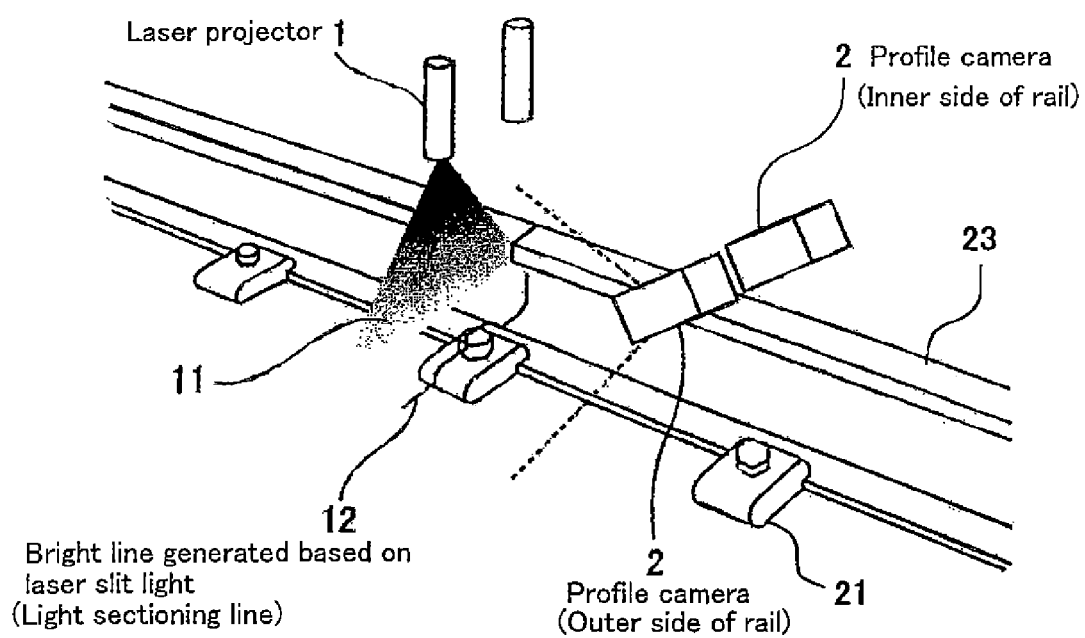
FIG. 3 is a view of arrangement of major components showing a measurement state according to the embodiment.

As shown in FIGS. 1 and 3, the range image obtaining system for the track 10 of the embodiment inspects the state of each of rail fastening devices 21 in which the center portion of a leaf spring is pressingly attached onto a sleeper by means of a fastening bolt and the base portion of the rail 23 is pressed by the tip end portion of the leaf spring, and the state of each of joint bars 22 which are disposed at both side surfaces of two rails 23 abutted with each other, joined together, and fastened to the respective rails 23 by means of bolts, in particular, the degree to which the bolts are loose.

The range image obtaining system for the track 10 of the embodiment includes laser slit light projecting devices 1 each of which projects a laser slit light 11, i.e., laser projectors 1, two-dimensional image imaging devices 2 each of which takes-in as a light sectioning image a bright line 12 formed by reflecting the laser slit light 11 on a surface of an object present in the vicinity of the rail 23, an image signal processing device 3 which calculates a height of each portion of the bright line 2 from an output of the two-dimensional image imaging device 2, i.e., a distance from the two-dimensional image imaging device 2, or a distance from an arbitrary horizontal plane, an information processing device 4 for forming a range image based on these distance information, and a display device 5 for displaying the image. Note that the range image is defined by parameters which are each position corresponding to the distance calculated, and the distance.

As the two-dimensional image imaging device 2, for example, a profile camera may be used. As used herein, the profile camera refers to a camera adapted to take a light sectioning image, perform a light sectioning measuring process in real time and output one-dimensional information of a height. Since the height of a target object is not greater than a rail tread 24 of the rail 23, in most cases, a reference horizontal plane for calculating a height distance could be assumed as the rail tread 24 for the sake of convenience.

Figure 4:
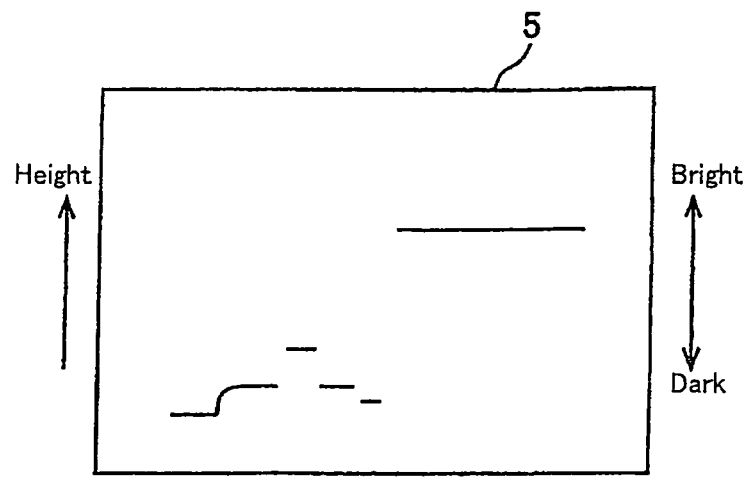
FIG. 4 is a view showing an exemplary light sectioning image according to the embodiment.

Each sensor unit includes the laser slit light projecting device 1 and the profile camera 2. The laser slit light 11 projected from vertically above the rail 23 is reflected on the surface of the rail 23 and the surface of the region in the vicinity of the rail 23, thereby forming a single bright line 12 (light sectioning line). The bright line 12 is merely a straight line when it is viewed from the direction in which the laser slit light 11 is projected. However, when the bright line 12 is viewed from a location which is a little deviated from the direction in which the laser slit light 11 is projected, toward the direction perpendicular to the direction in which the laser slit light 11 is projected, a profile appears within a light sectioning plane as shown in FIG. 4, for example, and is observed as a light sectioning image corresponding to the height of the reflected surface. Since the height of the surface of the target object within the light sectioning image corresponds to a longitudinal length of the image and an actual position is higher as the position of the bright line in the image is higher, an actual height can be calculated easily.

Figure 2:
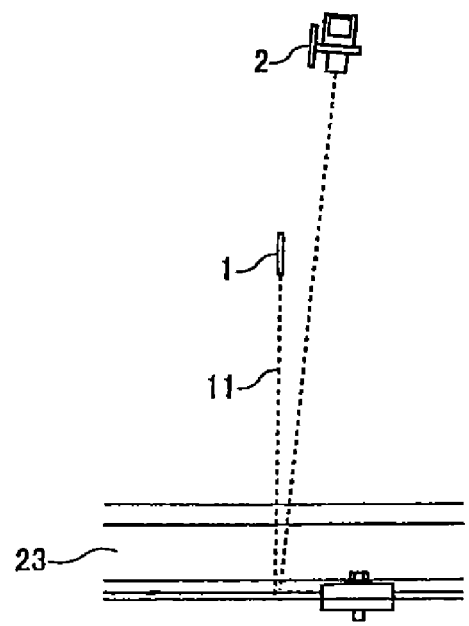
FIG. 2 is a side view showing arrangement of a camera and a laser projector according to the embodiment.

As shown in FIG. 2, the laser slit light projecting device 1 is positioned so that it projects the laser slit light 11 from above the rail 23 in a vertically downward direction and the bright line 12 generated based on the laser slit light 11 is substantially perpendicular to a lengthwise direction of the rail in a plan view. The profile camera 2 is able to take two-dimensional images 10000 times or more times for 1 second, and is positioned to take an image of the portion to which the laser light 11 is emitted, from a location slightly deviated from the direction in which the laser slit light 11 is projected, toward the direction perpendicular to the direction in which the laser slit light 11 is projected. If the profile camera 2 takes an image in such a manner that a light sectioning line on the rail tread or a light sectioning line on a horizontal plane is parallel to an image frame, a height of an optical point in the light sectioning image and a location of a pixel in the image have a simple relationship. Therefore, the height of the profile of the imaged object can be calculated easily from the image signal.

The sensor unit including the laser slit light projecting device 1 and the profile camera 2 is accommodated into a protective casing 32 provided under a underframe 31 of the railcar. The protective casing 32 has a protective glass 33 between the sensor unit and a measurement target object such as the rail 23. The protective glass 33 serves to block inside of the casing 32 from outside to prevent foreign matters from entering the sensor unit or colliding against the sensor unit. A heater film is bonded to the protective glass 33 to prevent water droplets from being generated on the protective glass 33 due to cool air, which would make the protective glass 33 opaque.

Upon the laser slit light 11 being projected from vertically above the rail 23, a light sectioning image is generated. By taking images of the bright line 12 in the vicinity of the rail 23 in repetition by using the profile camera 2 in the sensor unit being moved along the rail 23 while the railcar is running, it is possible to obtain light sectioning images between which locations of bright lines 12 are slightly deviated from each other are obtained at imaging intervals. In the case of using the profile camera 2 capable of taking images 10000 times or more times for 1 second, it is possible to obtain light sectioning images at intervals of about 3 mm even when the profile camera 2 is built into a railcar running at 110 km per hour.

Figure 5:
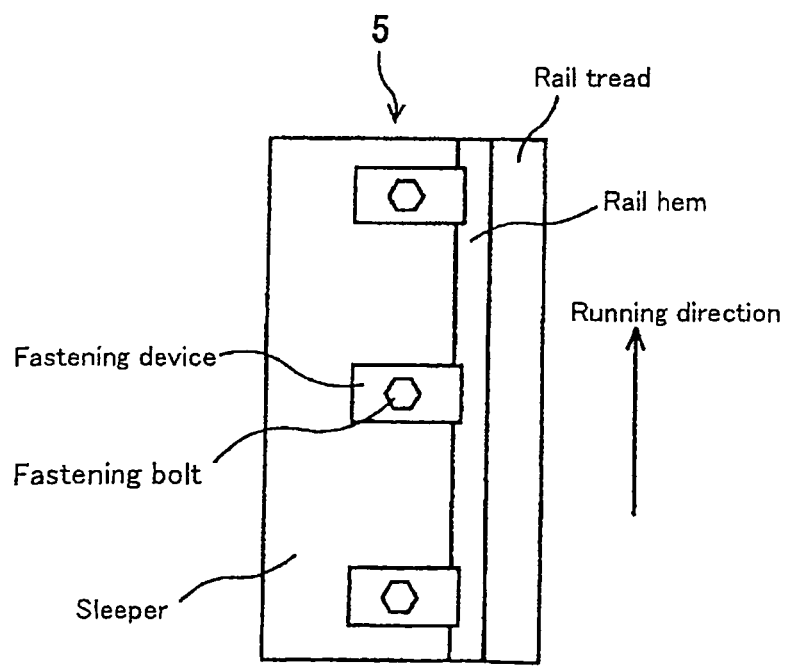
FIG. 5 is a view showing an exemplary range image according to the embodiment.

Accordingly, by using light sectioning images taken with a high frequency by the profile camera 2 mounted to the railcar running and obtained densely, and arranging light sectioning lines each represented by a darker color as the height of the reflected surface is lower, according to the distance information, along the rail, a gray scale image as shown in FIG. 5 is formed.

The image signal processing device 3 is a high-speed processing unit, which receives the two-dimensional image signal from the profile camera 2, and causes the light sectioning image to be displayed such that an optical point located higher is displayed as being bright and an optical point located lower is displayed as being dark. Thus, distance information of each location on the straight line generated based on the laser slit light 11 is defined. The gray scale information may be defined by, for example, a digital signal representing the height of 128 levels by 7 bits and used in a digital processing unit without transforming the gray scale information into an image. Image information including distance information which is formed from the two-dimensional image signal obtained from the profile camera 2 every time the profile camera 2 takes an image is stored in a memory device built into the image signal processing device 3 or a memory device 8 externally provided.

The memory device is capable of transmitting the stored information to the information processing device 4. The memory device may be an image memory device for storing information in a portable memory medium. When the portable memory medium is used, the information processing device 4 on the ground can obtain necessary information from the portable memory medium which contains the image information including distance information obtained during running of the railcar and analyze it.

The information processing device 4 receives voluminous amounts of image information including distance information which are generated along the rail 23, forms range image information representing a region in the vicinity of the rail 23 in a predetermined location, and causes the display device 5 to display the range image representing a distance by gray scales. The gray scale image exemplarily shown in FIG. 5 is a range image representing distance information relating to a height on a flat plane. From this gray scale image, a three-dimensional shape of a target region is recognized. For example, it is found out that the fastening bolt of the fastening device 21 is not present or is loose, from the fact that a height distance in a location where the fastening bolt should be present is different from a desired value and therefore, a gray value is different. Also, it is found that a fastening bolt of the joint bar 22 is not present or is loose due to the fact that a horizontal location of the fastening bolt is different from a desired location, and therefore a location of a portion having a gray scale representing the bolt is deviated.

To this end, the information processing device 4 is provided with a built-in or external parameter storage memory device, to pre-store reference information indicating standard states, such as shape information of the fastening device and the joint bar, especially, location information about the heights of the heads of the fastening bolts or locations where joint bar bolts are tightened. By comparing digital information about a range image formed based on actual measurement to reference information such as height information of a fastening device or joint bar which is a target object, it is detected whether or not the fastening bolt of the fastening device 21, or the fastening bolt of the joint bar 22 is present or whether or not the fastening bolt is loose. For example, if it is found that there is a bolt whose height is greater than a predetermined reference value (e.g., 5 mm) based on bolt top surface height data obtained, it is determined that this bolt is loose, and a person is notified of this information along with the positional information of the bolt. A result of the determination is displayed on the display device 5.

In accordance with the range image obtaining system for the track of the embodiment, the processing unit is capable of performing determination easily based on the digital data, and a person can easily find out a positional abnormality of the bolt or device from the gray scale image. The gray scale image may be replaced by a color representation of a height, such as a colored contour map.

The sensor units each including the laser slit light projecting device 1 and the profile camera 2 are positioned at inner side and outer side of the rail 23, respectively, so as to interpose the rail 23 between them, and individually monitor the fastening device 21 and the joint bar 22 at inner side and the fastening device 21 and the joint bar 22 at outer side, respectively. For correct detection of the profile generated from the laser slit light 11 which is emitted from the laser slit light projecting device 1 onto the joint bar 22, the laser slit light projecting device 1 is positioned to be a little displaced inward or outward relative to a location immediately above the rail 23 so that the laser slit light projecting device 1 is unlikely to form a shadow. It is preferable that sensor units having the same configuration are positioned symmetrically at both of the two rails 23 in order to monitor all of the bolts.

A tachometer generator 6 mounted to the railcar to detect a rotational speed of a wheel may feed a pulse synchronizing with the rotation of an axle. A pulse multiplication device 7 may regulate this pulse into a required cycle. The image signal processing device 3 may take-in the regulated pulse as a driving source. In response to this driving pulse, the profile camera 2 can take an image. In the case of using the tachometer generator 6, the profile camera 2 takes images at equal intervals as corresponding to a running distance of the railcar. The profile camera 2 capable of taking images 10000 times or more times can take images at distance intervals of about 3 mm even when the railcar is running at a speed of about 110 km/hr.

The range image obtaining system for the track 10, including the memory device 8 for storing and accumulating the light sectioning image information obtained by the profile camera 2 may be mounted to a business railcar running for business purposes and adapted to suitably collect information during normal running. And, the memory medium having accumulated the information by the memory device 8 may be carried into an analysis chamber, where the information read out by a computer is transformed into a range image. And, based on the range image, positional abnormalities of the bolt and the device on the rail can be detected. By incorporating such a system into the business railcar and making use of it, the fastening device 21 and the joint bar 22 are monitored closely to find out abnormalities of the bolts or the like, without overlooking of the loose of them, while avoiding that an operation for business purposes is impeded. In addition, degradation of the bolt and the like can be predicted from their displacement tendencies detected by observation performed over time. As a result, preventive maintenance can be carried out effectively.

Figure 6:
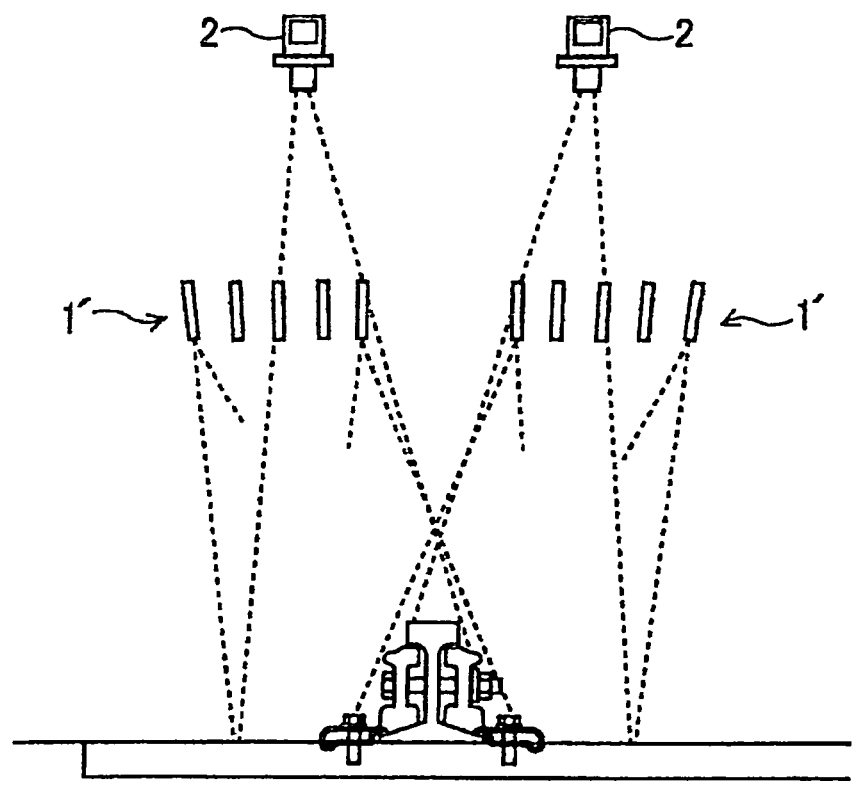
FIG. 6 is a front view showing another example of the laser projector for use in the embodiment.

FIG. 6 is a front view showing a configuration in which a plurality of projectors 1' are arranged instead of using a single laser projector as the laser slit light projecting device 1. In the case of using a single projector, insufficient light could be output and correct measurement might be difficult. In the daytime, outside light is intense, and therefore it might be difficult to recognize a light sectioning line clearly. In the case of using the single laser device, a laser device which is of a very large size and is expensive is needed to ensure a required amount of light.

To solve the above problem, the plurality of projectors 1' each emitting the laser slit light 11 are arranged to generate laser slit lights equivalent to a single laser slit light, to ensure a required amount of light. To generate the laser slit lights equivalent to the single laser slit light 11, the plurality of projectors 1' must be aligned accurately such that emitting planes of the laser slit lights emitted from individual laser projectors 1' overlap with each other correctly. By reducing a size of the laser projector in this way, a cost of the overall system can be reduced.

In accordance with the above configuration, the range image obtaining system for the track may be incorporated into the business railcar or the like to obtain detailed three-dimensional shape data of the rails, the fastening devices, the joint bars, etc., during running for business purposes. By obtaining high-dense data with a high frequency, degradation trend can be observed and a maintenance timing can be predicted correctly. Furthermore, since the three-dimensional shape data is transformed into the range image and displayed, determination can be made by a person.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A range image obtaining system for a track comprising:
   a laser slit light source disposed within a plane perpendicular to a tread of a rail and emits laser slit light within the plane;
   a two-dimensional image imaging device which is disposed to have an angle with respect to the plane perpendicular to the tread of the rail and obtains from a running railcar a plurality of light sectioning images generated from the laser slit light;
   an image signal processing device for calculating as distance information distances from the two-dimensional image imaging device based on respective ones of the plurality of light sectioning images; and
   an information processing device which arranges light sectioning lines in the plurality of light sectioning images along the rail, and generates a range image representing a height of a contour of a target object, whose images are taken by the two-dimensional image imaging device, by gray scales or color, based on the distance information respectively corresponding to the plurality of light sectioning images.

2. The range image obtaining system for the track according to claim 1, comprising:
   an image memory device for storing an image signal of the image obtained by the two-dimensional image imaging device in a portable memory medium, wherein the information processing device generates the range image based on the image signal received from the portable memory medium.

3. The range image obtaining system for the track according to claim 1,
   wherein the laser slit light source and the two-dimensional image imaging device are accommodated into a casing provided in a location above the rail and under a floor of a railcar.

4. The range image obtaining system for the track according to claim 1,
   wherein the laser slit light source includes a plurality of laser diodes arranged such that planes of slit lights emitted from the plurality of laser diodes overlap with each other within the plane perpendicular to the tread of the rail.

5. The range image obtaining system for the track according to claim 1, comprising:
two pairs of combinations each including the laser slit light source and the two-dimensional image imaging device, the two pairs being arranged such that the rail is interposed between the two pairs.

6. The range image obtaining system for the track according to claim 1, comprising:
an image processing device which inspects a fastening device and a joint bar in such a manner that each of a pre-stored three-dimensional shape model of the fastening device of the rail and a pre-stored three-dimensional shape model of the joint bar of the rail is compared to the range image.

7. The range image obtaining system for the track according to claim 1, being configured to actuate the two-dimensional image imaging device in response to a pulse signal obtained from a tachometer generator mounted to the railcar to obtain the light sectioning image.

\* \* \* \* \*